United States Patent
Martinez Iraola et al.

(10) Patent No.: US 10,942,954 B2
(45) Date of Patent: Mar. 9, 2021

(54) DATASET ADAPTATION FOR HIGH-PERFORMANCE IN SPECIFIC NATURAL LANGUAGE PROCESSING TASKS

(71) Applicant: International Business Machines Corporation, Armonk, NY (US)

(72) Inventors: David Martinez Iraola, Sunnyvale, CA (US); Sheng Hua Bao, San Jose, CA (US); Donna K. Byron, Petersham, MA (US); Priscilla Moraes, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 15/852,167

(22) Filed: Dec. 22, 2017

(65) Prior Publication Data
US 2019/0197128 A1    Jun. 27, 2019

(51) Int. Cl.
*G06F 16/332* (2019.01)
*G06N 20/00* (2019.01)
*G06F 16/33* (2019.01)

(52) U.S. Cl.
CPC ...... *G06F 16/3322* (2019.01); *G06F 16/3329* (2019.01); *G06F 16/3344* (2019.01); *G06N 20/00* (2019.01)

(58) Field of Classification Search
CPC ............. G06F 16/3322; G06F 16/3329; G06F 16/3344; G06F 40/56; G06F 16/2452; G06F 16/2453; G06F 16/43; G06F 16/685; G06F 40/20; G06N 20/00
USPC ....................................................... 707/767
See application file for complete search history.

(56) References Cited

U.S. PATENT DOCUMENTS

| | | | | |
|---|---|---|---|---|
| 7,054,803 B2* | 5/2006 | Eisele | .................. | G06F 40/45 704/2 |
| 9,183,323 B1* | 11/2015 | Shaw | ................. | G06F 16/3325 |
| 10,402,490 B1* | 9/2019 | Benavides | ............ | G06F 40/232 |
| 2006/0117003 A1* | 6/2006 | Ortega | .................. | G06F 40/274 |
| 2009/0024613 A1* | 1/2009 | Niu | ..................... | G06F 16/3338 |
| 2009/0063461 A1* | 3/2009 | Wang | ..................... | G06Q 30/02 |
| 2010/0286979 A1* | 11/2010 | Zangvil | .................. | G06F 40/40 704/9 |
| 2014/0163962 A1* | 6/2014 | Castelli | ............. | G06F 16/90332 704/9 |
| 2014/0188665 A1* | 7/2014 | Baker | ................. | G06Q 30/0625 705/26.62 |
| 2015/0081279 A1* | 3/2015 | Suleman | ............. | G06F 16/3329 704/9 |

(Continued)

FOREIGN PATENT DOCUMENTS

WO    2016209213 A1    12/2016

*Primary Examiner* — Evan Aspinwall
(74) *Attorney, Agent, or Firm* — Patterson + Sheridan, LLP (57) ABSTRACT

Systems, methods, and computer program products to perform an operation comprising identifying a first available dataset having a degree of similarity to a received input dataset that exceeds a similarity threshold, determining, based on a plurality of features of the first available dataset and a plurality of features of the input dataset, a set of recommendations for transforming the input dataset, and transforming a text of the input dataset based on the set of recommendations and to optimize the input dataset for processing by a natural language processing (NLP) algorithm.

20 Claims, 6 Drawing Sheets

(56) References Cited

U.S. PATENT DOCUMENTS

| | | |
|---|---|---|
| 2015/0269139 A1* | 9/2015 | McAteer ................. G06F 40/30 704/9 |
| 2015/0324440 A1* | 11/2015 | Subramanian ...... G06F 16/3338 707/694 |
| 2016/0092557 A1 | 3/2016 | Stojanovic et al. |
| 2016/0162456 A1* | 6/2016 | Munro ................... G06N 20/00 704/9 |
| 2016/0267128 A1* | 9/2016 | Dumoulin ........... G06F 16/3322 |
| 2017/0091320 A1* | 3/2017 | Psota ...................... G06F 16/35 |
| 2017/0098034 A1 | 4/2017 | Godbold et al. |
| 2017/0344631 A1* | 11/2017 | Thirumalai-Anandanpillai .......... G06F 16/338 |
| 2018/0349472 A1* | 12/2018 | Kohlschuetter ....... G06F 16/319 |
| 2019/0065470 A1* | 2/2019 | Matthews .......... G06Q 10/0635 |

* cited by examiner

DATASET ADAPTATION FOR HIGH-PERFORMANCE IN SPECIFIC NATURAL LANGUAGE PROCESSING TASKS

BACKGROUND

The present invention relates to computing tasks, and more specifically, to dataset adaptation for high-performance in specific natural language processing tasks.

Natural language processing (NLP) algorithms rely on machine learning models that are trained over different types of text to perform different types of NLP tasks, such as information extraction, text classification, and summarization. However, it is difficult to apply NLP algorithms to different types of datasets. For example, the NLP algorithms may have been trained and tested over datasets that have different types of text than a new dataset which needs to be processed using the NLP algorithms. Furthermore, the new dataset may not be compatible with the requirements of the NLP algorithms.

SUMMARY

According to one embodiment, a method comprises identifying a first available dataset having a degree of similarity to a received input dataset that exceeds a similarity threshold, determining, based on a plurality of features of the first available dataset and a plurality of features of the input dataset, a set of recommendations for transforming the input dataset, and transforming a text of the input dataset based on the set of recommendations and to optimize the input dataset for processing by a natural language processing (NLP) algorithm.

In another embodiment, a system comprises a processor and a memory storing instructions, which when executed by the processor, performs an operation comprising identifying a first available dataset having a degree of similarity to a received input dataset that exceeds a similarity threshold, determining, based on a plurality of features of the first available dataset and a plurality of features of the input dataset, a set of recommendations for transforming the input dataset, and transforming a text of the input dataset based on the set of recommendations and to optimize the input dataset for processing by a natural language processing (NLP) algorithm.

In another embodiment, a computer-readable storage medium has computer-readable program code embodied therewith, the computer-readable program code executable by a processor to perform an operation comprising identifying a first available dataset having a degree of similarity to a received input dataset that exceeds a similarity threshold, determining, based on a plurality of features of the first available dataset and a plurality of features of the input dataset, a set of recommendations for transforming the input dataset, and transforming a text of the input dataset based on the set of recommendations and to optimize the input dataset for processing by a natural language processing (NLP) algorithm.

DETAILED DESCRIPTION

Embodiments disclosed herein provide techniques to adapt datasets to achieve high performance in natural language processing (NLP) tasks. Generally, embodiments disclosed herein analyze an input dataset to an NLP task to identify similar, known datasets that have been applied to the same (or similar) NLP tasks. Embodiments disclosed herein may then determine differences between the input dataset and the identified similar datasets. Based on the determined differences, embodiments disclosed herein generate one or more recommendations for transforming the input dataset, which are then used to transform the dataset. The desired NLP task may then be applied to the transformed dataset, resulting in better performance than would have been achieved using the unmodified input dataset.

Figure 1:
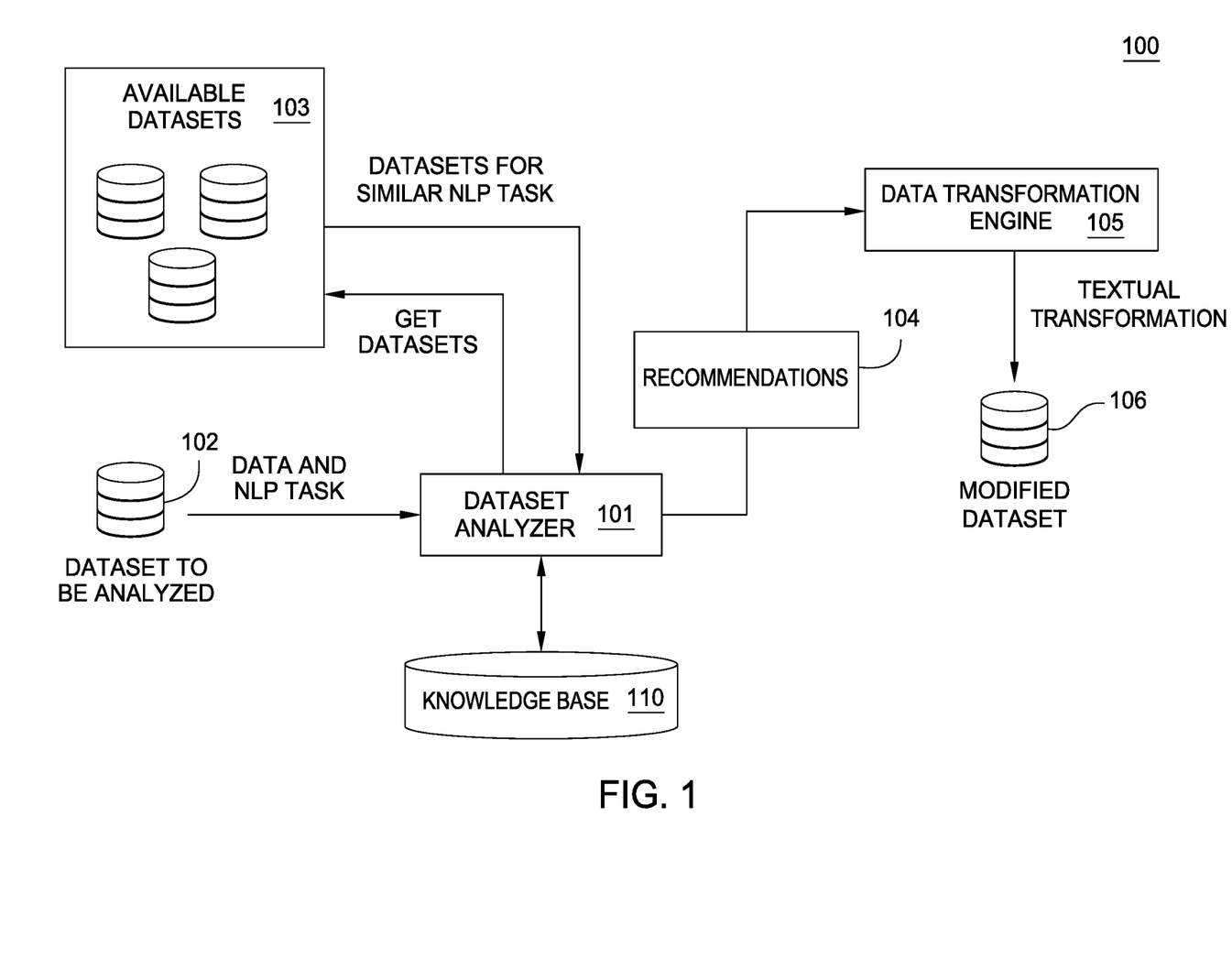
FIG. 1 illustrates an example system which provides dataset adaptation for high-performance in specific natural language processing tasks, according to one embodiment.

FIG. 1 illustrates an example system 100 which provides dataset adaptation for high-performance in specific natural language processing tasks, according to one embodiment. As shown, the system 100 includes a dataset analyzer 101, which orchestrates the transformation of an input dataset 102 to optimize the processing performance of an NLP task applied to the dataset 102. The input dataset 102 is generally representative of any type of textual data received from any number and types of data sources. However, in some embodiments, the input to the dataset analyzer 101 may be a feature vector representing the textual data of the input dataset 102. For example, the NLP task may be to extract drug interaction information from text in the input dataset 102. In such an example, the text of the input dataset 102 may include textual data from web pages, social media posts, project reports, scholarly articles, journals, drug labels, patient records, and the like.

The dataset analyzer 101 may then compare the input dataset 102 to a plurality of available datasets 103. The available datasets 103 are representative of any type of dataset including textual data, as well as feature vectors representing features (or attributes) of each dataset in the available datasets 103. The dataset analyzer 101 may preprocess the input available datasets 103 to extract different features of each dataset, which are stored in the knowledge base 110. The preprocessing performed by the dataset analyzer 101 may further include modifying the available datasets 103, applying different NLP algorithms to each modified available dataset 103, and monitoring the performance of each NLP algorithm applied to each modified available dataset 103. Doing so allows the dataset analyzer 101 to more accurately compare the input dataset 102 to the available datasets 103.

Generally, the dataset analyzer 101 compares the input dataset 101 to the available datasets 103 using any number of techniques, such as linguistic and representational characteristics, grammaticality, text complexity, word similarity, number of words, and the like. The dataset analyzer 101 may then select one or more datasets from the available datasets 103 that are most similar to the input dataset 102. For example, if the input dataset 102 includes a plurality of short social media publications, the dataset analyzer 101 may return available datasets 103 that include short social media publications as well as other available datasets 103 having text similar in length to the text of the social media publications in the input dataset 102. Furthermore, the dataset analyzer 101 would refrain from returning available datasets 103 that are not similar to the input dataset 102, such as available datasets 103 that include lengthy text publications, such as scholarly articles.

The dataset analyzer 101 may then compare each returned dataset from the available datasets 103 to the input dataset 102 to determine a set of differences between the input dataset 102 and each returned available dataset 103. The dataset analyzer 101 may then output the differences for display to a user. The dataset analyzer 101 further determines the NLP algorithms that are associated with the best performance in processing the most similar datasets returned from the available datasets 103. For each such NLP algorithm, the dataset analyzer 101 determines the expected performance of the NLP algorithm over the input dataset 102. The dataset analyzer 101 may also output the expected performance to the user.

The dataset analyzer 101 then generates a set of recommendations 104 based on the identified differences between the input dataset 102 and the available datasets 103, and the expected performance for the NLP algorithms over the input dataset 102. The dataset analyzer 101 may then output the set of recommendations 104 to the user. Table I illustrates an example of dataset features for an example input dataset 102, an example available dataset 103, two NLP algorithms, and a set of recommendations 104 generated by the dataset analyzer 101.

TABLE I

| Dataset Feature | Input dataset 102 | Available Dataset 103 | Expected Performance Loss (%) for NLP Algorithm X | Expected Performance Loss (%) for NLP Algorithm Y | Recommendation 104 |
|---|---|---|---|---|---|
| Avg. Sentence Length (tokens) | 7.2 | 8.2 | 5 | 2 | Generate and/or collect longer sentences |
| Grammaticality score | 0.20 | 0.95 | 20 | 23 | Generate and/or collect more grammatical sentences |
| Text complexity score | 0.40 | 0.80 | 15 | 15 | Generate and/or collect sentences of higher complexity |
| Word similarity score | 0.30 | | 50 | 10 | Generate and/or collect sentences using keywords |
| Topic similarity score | 0.10 | | 20 | 2 | Generate and/or collect sentences using topic cues |

As shown, the dataset analyzer 101 has computed feature values for a plurality of example features for the input dataset 102 and an example available dataset 103. More generally, however, the dataset analyzer 101 may compute feature values for any number and type of features, such as word embedding entropy scores, vocabulary complexity scores, and the like, as well as for any number of available datasets 103 that are determined to be similar to the input dataset 102. For example, as shown, the text of the input dataset 102 has 7.2 words (or tokens) per sentence, while the text of the available dataset 103 has 8.2 tokens per sentence. The dataset analyzer 101 may compare these two values, and determine that the difference exceeds a predefined threshold stored in the knowledge base, and generate a recommendation 104 to generate and/or collect longer sentences for the input dataset 102. Furthermore, as shown, the dataset analyzer 101 computes an expected performance loss of 5% for processing the input dataset 102 using NLP algorithm X, and 2% for NLP algorithm Y. The dataset analyzer 101 may generate the recommendation 104 based on the expected performance losses as well as the difference in feature values exceeding the threshold. However, in one embodiment, the dataset analyzer 101 generates the recommendation 104 based on one or more of the expected performance losses exceeding a loss threshold in the knowledge base 110. Furthermore, the knowledge base 110 may include one or more rules for generating a respective rule based on each feature.

As shown, the system 100 includes a dataset transformation engine 105, which is configured to modify the input dataset 102 based on the recommendations 104 generated by the dataset analyzer 101. The dataset transformation engine 105 may perform a data transformation and/or a data synthesis operation on the input dataset 102. To perform a data transformation, the dataset transformation engine 105 creates a representation of the data in the input dataset 102 based on the recommendations 104. Stated differently, based on the text of the input dataset 102, the dataset transformation engine 105 regenerates text that complies with the recommendations 104. For example, the dataset transformation engine 105 may take the input dataset 102 as input, and generate a modified dataset 106 that includes longer sentences than the input dataset 102 (e.g., based on the first recommendation 104 in Table I). More generally, the dataset transformation engine 105 may apply simplification and/or sophistication of lexicon, grammar, and/or referring expressions in the input dataset. For example, the dataset transformation engine 105 may replace lexical items, fragment sentences, remove relative clauses, and remove conjunctions.

In performing data synthesis, the dataset transformation engine 105 identifies the need for more data within a given topic (or category, or class) based on the recommendations 104. To do so, the dataset transformation engine 105 leverages sets of structured data in the knowledge base 110, and generate text using the guidelines provided by the recommendations 104 (e.g. create longer sentences, generate sentences having a higher complexity, etc.). The synthesized data generated by the dataset transformation engine 105 complies with the linguistic input of the recommendation for better performance, and will be automatically tagged since it is generated based on structured sources of data that are tied to semantics. For example, a recommendation 104 may require data describing relations between companies, employees, and the contracts the employees are working on to improve an input dataset 102. As such, the dataset transformation engine 105 may query relevant data from data sources (e.g., company, employee, and contract database tables, which may be stored in the knowledge base 110, or retrieved from a corporate database). The dataset transformation engine 105 may then use the received data from the database tables to generate text that complies with the recommendations 104, and is tagged with the appropriate named entities (e.g., company name and/or ID, employee name and/or ID, contract name and/or ID), as well as a corresponding part of speech. Once the modified dataset 106 is generated and/or stored, the requested NLP algorithm may be applied to the modified dataset 106, and the results may be stored for later use. Doing so improves performance of the system, as processing performance is improved by applying the NLP algorithm to the modified dataset 106, which is tailored to the NLP algorithm, rather than applying the NLP algorithm to the input dataset 102, which may not be tailored to the NLP algorithm (and result in performance loss).

Figure 2:
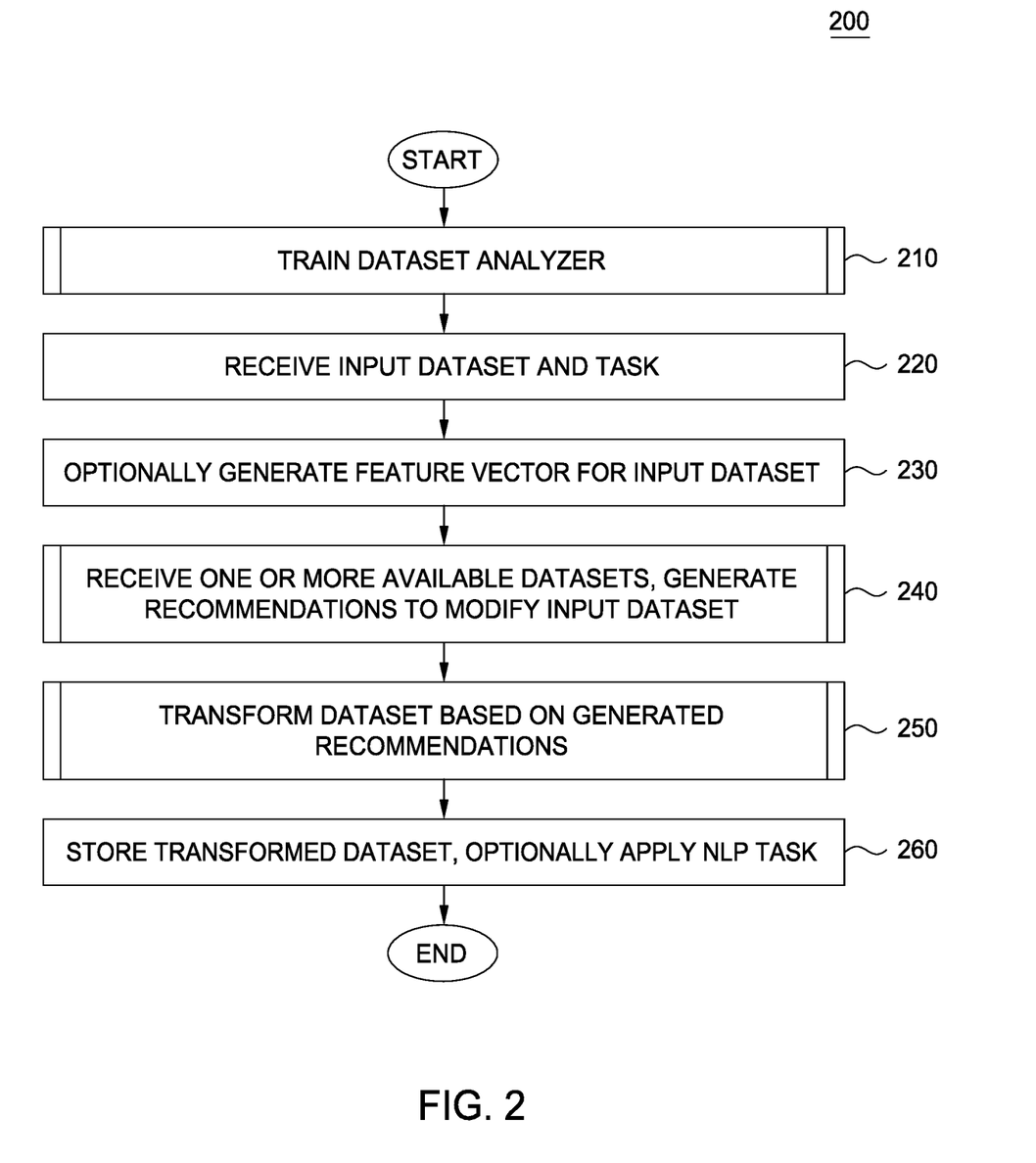
FIG. 2 is a flow chart illustrating an example method to provide dataset adaptation for high-performance in specific natural language processing tasks, according to one embodiment.

FIG. 2 is a flow chart illustrating an example method 200 to provide dataset adaptation for high-performance in specific natural language processing tasks, according to one embodiment. As shown, the method 200 begins at block 210, described in greater detail with reference to FIG. 3, where the dataset analyzer 101 is trained. Generally, to train the dataset analyzer 101, benchmarking datasets from the available datasets 103 are applied to a variety of NLP tasks. Furthermore, transformations are applied to the available datasets 103, and the transformed datasets are applied to the variety of NLP tasks. The transformations may be based on one or more transformation rules associated with each NLP task. Doing so creates the knowledge base 110 describing each available dataset 103 (including transformations), and the performance of each NLP algorithm to each available dataset 103.

At block 220, the dataset analyzer 101 receives an input dataset 102 and an indication of an NLP task (or algorithm) to be applied to the input dataset 102. Generally, the input dataset 102 may be any textual dataset, or a feature vector describing different features of the input dataset 102. The NLP task or algorithm may be of any type. At block 230, if the textual data of the input dataset 102 is received (and not a feature vector describing the input dataset 102), the dataset analyzer 101 generates a feature vector for the input dataset 102. The feature vector may describe the text of the input dataset 102 in light of a plurality of different features (e.g., text length, complexity, grammaticality, etc.). Doing so allows the dataset analyzer 101 to identify similar available datasets 103 and generate a set of recommendations for modifying the input dataset 102.

At block 240, the dataset analyzer 101 receives one or more available datasets 103 and associated NLP algorithms that are similar to the received input dataset 102 and NLP task, and generates one or more recommendations to modify the received dataset 102. Generally, the dataset analyzer 101 compares the features of the received input dataset 102 to the corresponding features of each available dataset 103. For example, the dataset analyzer 101 compute a similarity score for the input dataset 102 relative to the available datasets 103, and select one or more available datasets 103 having a similarity score exceeding a threshold. The similarity score may be computed based on the feature values in the feature vectors of the input dataset 102 and the available datasets 103. Doing so selects the available datasets 103 having the most similar features to the input dataset 102. Additionally, for the identified similar available datasets 103, the dataset analyzer 101 generates recommendations 104 based on feature differences relative to the input dataset 102. For example, if the input dataset 102 has a word embedding entropy score that differs from the word embedding entropy score of a similar available dataset 103, the dataset analyzer 101 may generate, based on one or more associated rules, a recommendation 104 to modify the input dataset 102 such that the word embedding entropy of the input dataset 102 more closely matches the word embedding entropy of the similar available dataset 103.

At block 250, described in greater detail with reference to FIG. 5, the dataset analyzer 101 provides the generated recommendations 104 to the dataset transformation engine 105, which generates a transformed dataset 106 based on the input dataset 102 and the generated recommendations 104. As previously stated, the dataset transformation engine 105 may perform a transform operation and/or a synthesis operation on the input dataset 102 based on the recommendations 104. At block 260, the dataset transformation engine 105 stores the transformed dataset 106. The dataset transformation engine 105, the dataset analyzer 101, and/or another designated component of the system 100 may then apply the requested NLP task to the transformed dataset 106. Doing so improves performance by providing a transformed dataset 106 which has been tailored to the associated NLP algorithm which performs the requested NLP task.

Figure 3:
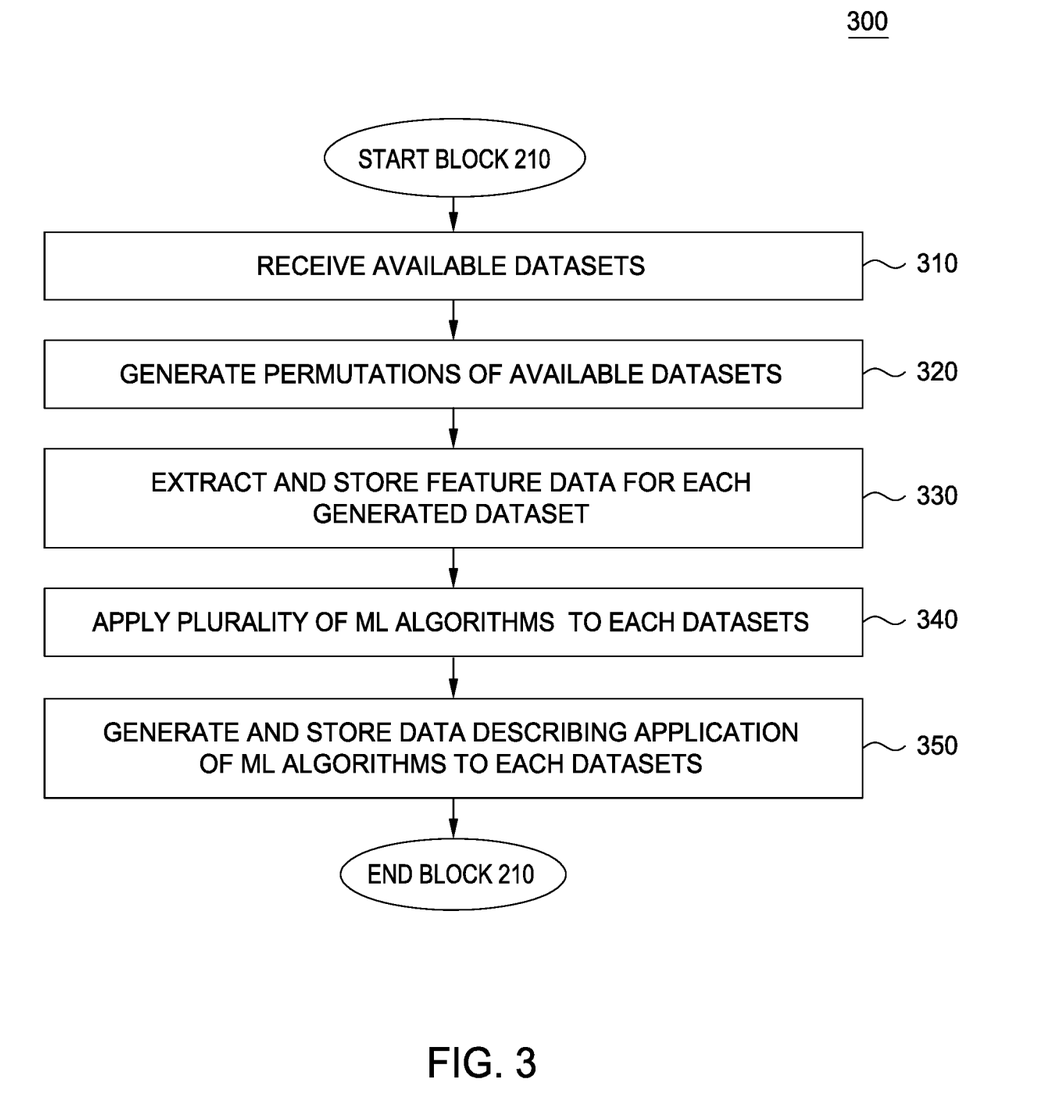
FIG. 3 is a flow chart illustrating a method to train a dataset analyzer, according to one embodiment.

FIG. 3 is a flow chart illustrating a method 300 corresponding to block 210 to train a dataset analyzer, according to one embodiment. As shown, the method 300 begins at block 310, where the dataset analyzer 101 receives the datasets of the available datasets 103. At block 320, the dataset analyzer 101 generates permutations of each dataset received at block 310 based on one or more transformation rules. In one embodiment, the dataset analyzer 101 may apply a set of transformations associated with a different NLP task that are stored in the knowledge base 110. For example, based on a set of transformation rules specified in the knowledge base 110, the dataset analyzer 101 may remove function words from the original text of the available datasets 103, alter plurals from the original text of the available datasets 103, and add noise to the original text of the available datasets 103 to determine the performance of a text grammaticality NLP algorithm applied to each dataset 103. Doing so allows the dataset analyzer 101 to generate datasets 103 that have different text grammaticality scores on a range of text grammaticality scores (e.g., 0.0 to 1.0). More generally, the dataset analyzer 101 generates exhaustive permutations of each available dataset 103, e.g., by adding, removing, and/or modifying the text of each available dataset 103 based on one or more permutation rules stored in the knowledge base 110.

At block 330, the dataset analyzer 101 extracts features from each dataset 103 received at block 310 and each permutation of the datasets 103 generated at block 320. The dataset analyzer 101 may then store the features as feature vectors describing each dataset 103 in the knowledge base 110. At block 340, the dataset analyzer 101 applies a plurality of different NLP algorithms to each dataset 103 received at block 310 and each permutation of the datasets 103 generated at block 320. In doing so, the dataset analyzer 101 monitors and analyzes the performance characteristics of each NLP algorithm applied to each dataset 103. At block 350, the dataset analyzer 101 stores data describing the performance characteristics of each NLP algorithm applied to each dataset 103 in the knowledge base 110. Doing so allows the dataset analyzer 101 to subsequently consider the performance (e.g., time, CPU cycles spent, RAM consumed, etc.) of each NLP algorithm relative to the features of each dataset 103 when determining how to modify an input dataset 102 for a specific NLP task.

Figure 4:
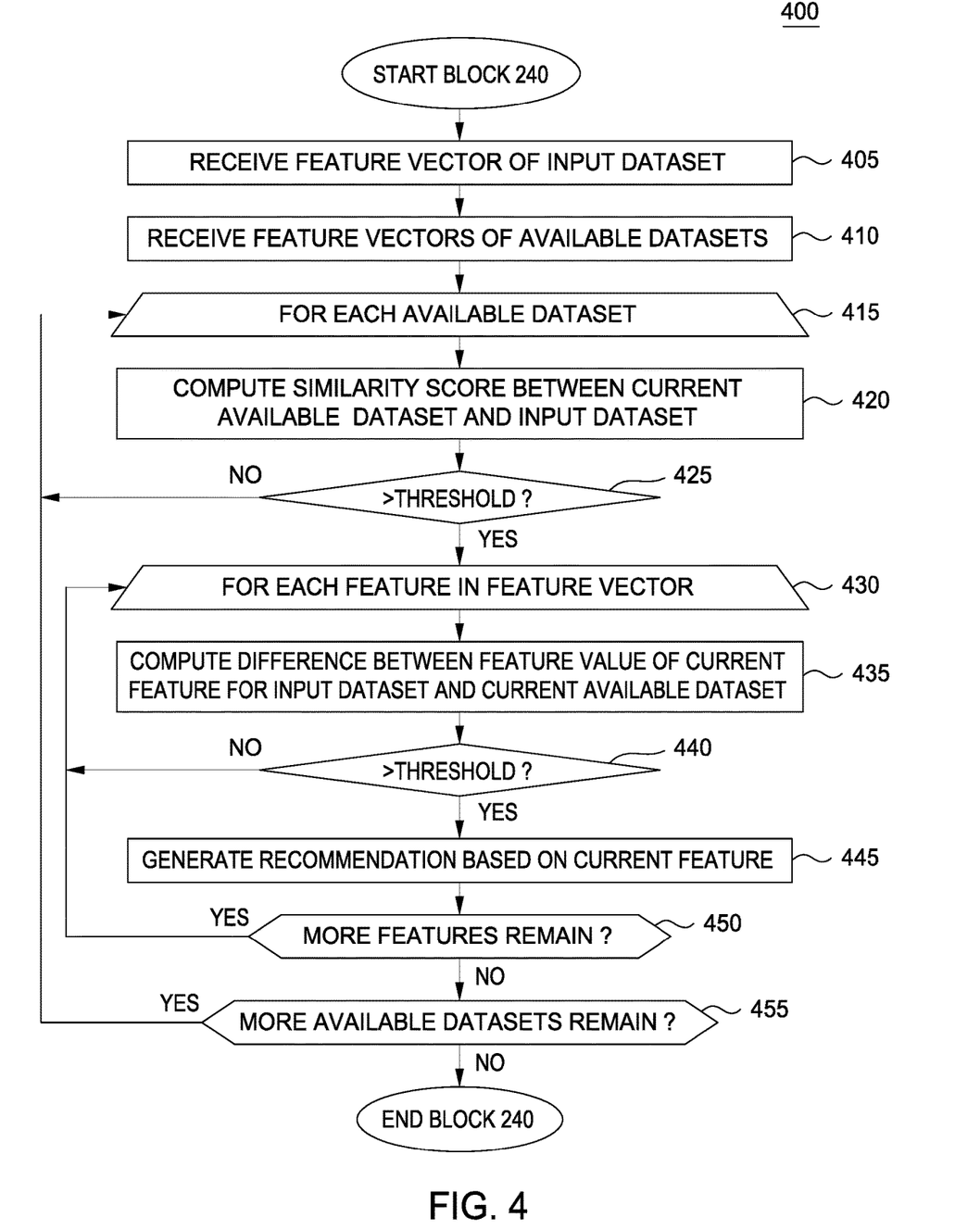
FIG. 4 is a flow chart illustrating a method to identify similar datasets and generate recommendations to modify a dataset, according to one embodiment.

FIG. 4 is a flow chart illustrating a method 400 corresponding to block 240 to identify similar datasets and generate recommendations to modify a dataset, according to one embodiment. As shown, the method 400 begins at block 405, where the dataset analyzer 101 receives the feature vector of the input dataset 102. At block 410, the dataset analyzer 101 receives the feature vectors of the available datasets 103, e.g., from the available datasets 103 and/or the knowledge base 110. At block 415, the dataset analyzer 101 executes a loop including blocks 420-455 for each available dataset 103. At block 420, the dataset analyzer 101 computes a similarity score reflecting a degree of similarity between the input dataset 102 and the current available dataset 103. In at least one embodiment, the dataset analyzer 101 computes the similarity score based on a similarity of each score in the feature vectors of the datasets 102, 103. Generally, the dataset analyzer 101 computes a similarity score reflecting a greater similarity where the feature scores in the feature vectors are more similar (e.g., a smaller difference between the feature scores).

At block 425, the dataset analyzer 101 determines whether the similarity score computed at block 420 is greater than a similarity score threshold. If the similarity score does not exceed the threshold, the dataset analyzer 101 discards the current dataset 103 as not being similar to the input dataset 102 and returns to block 415 to consider other available datasets 103. If the similarity score computed at block 420 exceeds the similarity score threshold, the dataset analyzer 101 proceeds to block 430. At block 430, the dataset analyzer 101 executes a loop including blocks 435-450 for each feature in the feature vectors of the datasets 102, 103. At block 435, the dataset analyzer 101 computes a difference between the feature values of the current feature specified in the feature vectors of the input dataset 102 and the current available dataset 103. At block 440, the dataset analyzer 101 determines whether the difference feature values computed at block 435 exceeds a corresponding feature value threshold specified in the knowledge base 110. A different feature value threshold may be defined for each different feature in the feature vectors. In at least one embodiment, the dataset analyzer 101 determines the threshold based on the training process described in FIG. 3, e.g., by identifying what feature values correspond to improved processing performance.

If the difference between the feature values does not exceed the feature value threshold for the current feature, the dataset analyzer 101 returns to block 430. Otherwise, the dataset analyzer 101 proceeds to block 445, where the dataset analyzer 101 generates a recommendation to modify the input dataset 102 based on the current feature. For example, if the current feature describes word complexity, the dataset analyzer 101 would generate a recommendation to increase or decrease the complexity of the words of the input dataset 102, as the case may be, to more closely match the word complexity of the current available dataset 103. At block 450, the dataset analyzer 101 determines whether more features remain. If more features remain, the dataset analyzer 101 returns to block 430. Otherwise, the dataset analyzer 101 proceeds to block 455, where the dataset analyzer 101 determines whether more available datasets 103 remain. If more available datasets 103 remain, the dataset analyzer 101 returns to block 415. Otherwise, the method 400 ends.

Figure 5:
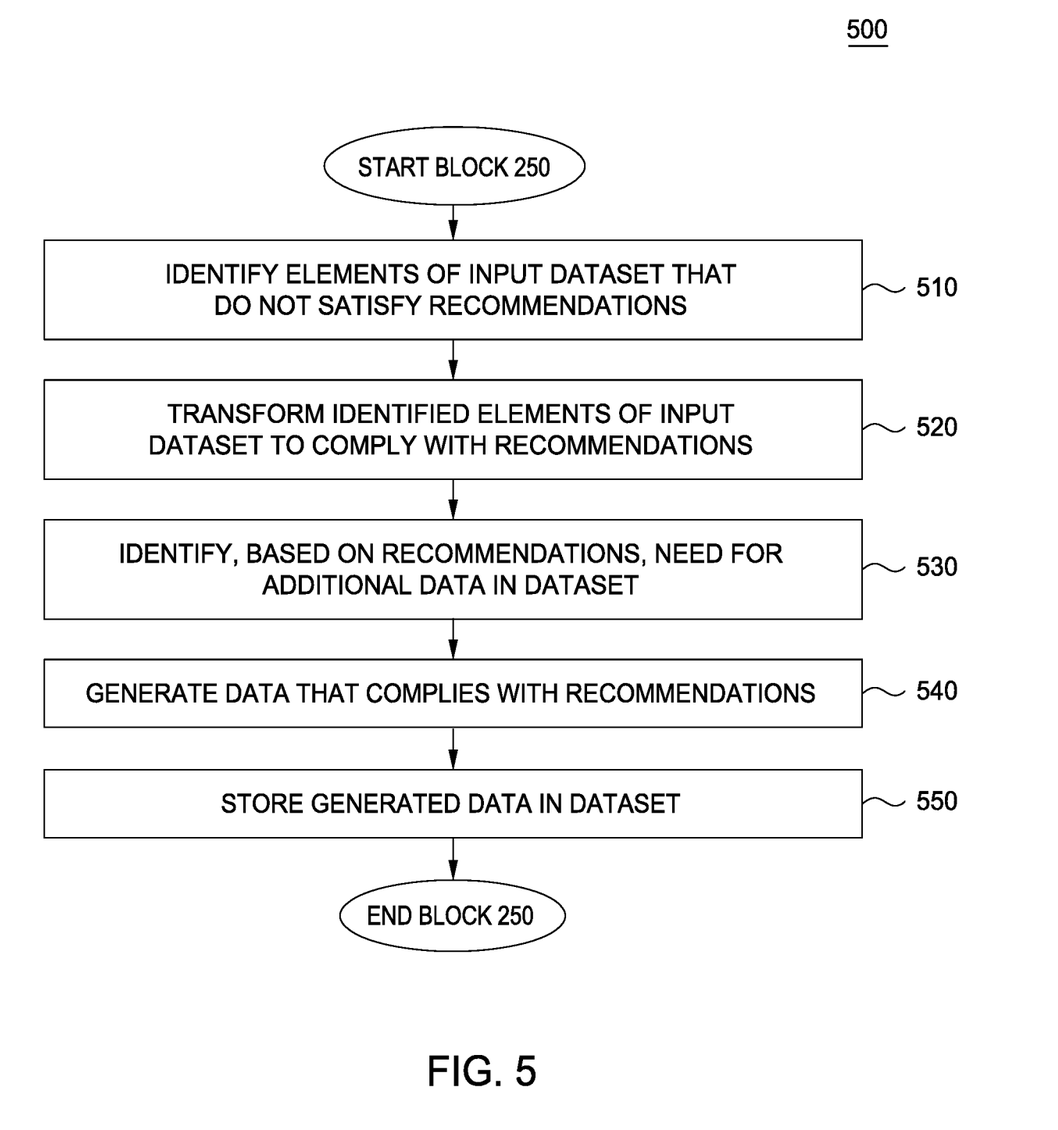
FIG. 5 is a flow chart illustrating a method to transform a dataset based on generated recommendations, according to one embodiment.

FIG. 5 is a flow chart illustrating a method 500 corresponding to block 250 to transform a dataset based on generated recommendations, according to one embodiment. As shown, the method 500 begins at block 510, where the dataset transformation engine 105 identifies one or more elements of the input dataset 102 that do not satisfy one of the recommendations 104. For example, the dataset transformation engine 105 may identify one or more sentences that do not meet a minimum sentence length specified by one or more recommendations 104. At block 520, the dataset transformation engine 105 transforms the identified elements of the input dataset 102 to comply with the recommendations 104. For example, the dataset transformation engine 105 would generate, based on the sentences identified at block 510, one or more sentences meeting the minimum length specified in the recommendations 104. The generated sentences would have the same semantic meaning as the original sentences, but would comply with the rules specified in the recommendations 104, thereby generating an improved dataset 106 for the NLP task.

At block 530, the dataset transformation engine 105 identifies the need for additional data in the input dataset 104 based on the recommendations 104. For example, a recommendation 104 may specify to provide complex terms describing business initiatives. At block 540, the dataset transformation engine 105 generates textual data that complies with the recommendations 104. For example, the dataset transformation engine 105 may receive structured data from corporate databases, knowledge bases, etc., that describe the business initiatives of the corporation. The dataset transformation engine 105 may then generate text that includes the data describing the business initiatives, and meets the complexity requirements specified by the recommendations. At block 550, the dataset transformation engine 105 stores the generated data as the modified dataset 106.

Figure 6:
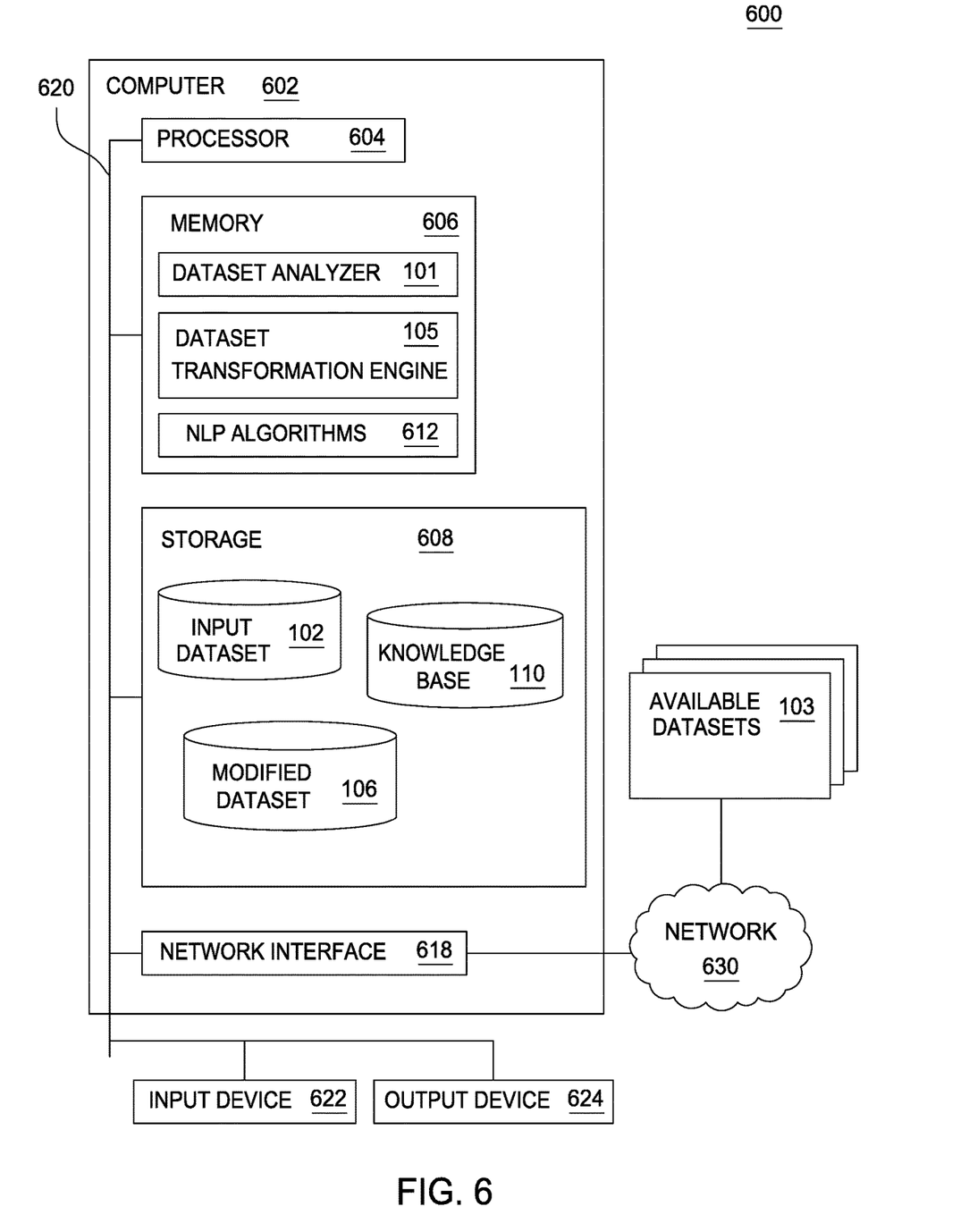
FIG. 6 illustrates a system which provides dataset adaptation for high-performance in specific natural language processing tasks, according to one embodiment.

FIG. 6 illustrates a system which provides dataset adaptation for high-performance in specific natural language processing tasks, according to one embodiment. networked system 600 includes a computing system 602. The computing system 602 may also be connected to other computers (e.g., computers hosting the available datasets 103) via a network 630. In general, the network 630 may be a telecommunications network and/or a wide area network (WAN). In a particular embodiment, the network 630 is the Internet.

The computing system 602 generally includes a processor 604 which obtains instructions and data via a bus 620 from a memory 606 and/or a storage 608. The computing system 602 may also include one or more network interface devices 618, input devices 622, and output devices 624 connected to the bus 620. The computing system 602 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computing system 602 to communicate with other computers via the network 630.

The storage 608 is representative of hard-disk drives, solid state drives, flash memory devices, optical media and the like. Generally, the storage 608 stores application programs and data for use by the computing system 602. In addition, the memory 606 and the storage 608 may be considered to include memory physically located elsewhere; for example, on another computer coupled to the computing system 602 via the bus 620.

The input device 622 may be any device for providing input to the computing system 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computing system 602. The output device 624 may include output devices such as monitors, touch screen displays, and so on.

As shown, the memory 606 contains the dataset analyzer 101 and the dataset transformation engine 105, each described in greater detail above. The memory 606 further includes one or more NLP algorithms 612, which are representative of any type of NLP algorithm. As shown, the storage 608 contains the input dataset 102, modified dataset 106, and the knowledge base 110, each described in greater detail above. Generally, the system 600 is configured to implement all systems, methods, and functionality described above with reference to FIGS. 1-5.

Advantageously, embodiments disclosed herein provide techniques to improve processing performance of NLP algorithms 612 applied to input datasets 102 by generating a modified dataset 106 that is tailored to the NLP algorithms 612. Doing so improves performance of the computer 602 by processing tasks faster, conserving system resources, and using less energy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the dataset analyzer 101 and/or the dataset transformation engine 105 could execute on a computing system in the cloud. In such a case, the dataset analyzer 101 could generate recommendations 104 and store the generated recommendations 104 at a storage location in the cloud. Similarly, the dataset transformation engine 105 could generate a modified dataset 106 and store the modified dataset 106 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
 receiving an input dataset comprising textual data from a plurality of sources;
 determining a degree of similarity between a first available dataset, from a plurality of available datasets, and the input dataset; and
 upon determining that the degree of similarity exceeds a similarity threshold:
  generating, based on performance of a natural language processing (NLP) algorithm with respect to the first available data set and based further on a plurality of features of the first available dataset and a plurality of features of the input dataset, a set of recommendations for transforming the input dataset, wherein each recommendation of the set of recommendations, when applied to the input dataset, will increase the degree of similarity between the input dataset and the first available dataset; and
  transforming the textual data of the input dataset based on the set of recommendations, such that the input dataset becomes more similar to the first available dataset and is optimized for processing by the NLP algorithm.

2. The method of claim 1, wherein the first available dataset is of a plurality of available datasets, wherein identifying the first available dataset comprises:
 computing a similarity score reflecting the degree of similarity between the first available dataset and the input dataset; and
 determining that the similarity score exceeds a similarity threshold.

3. The method of claim 1, further comprising prior to identifying the first available dataset:

receiving a plurality of available datasets including the first available dataset;

transforming each of the plurality of available datasets into a plurality of transformed datasets based on at least one transformation rule;

extracting a plurality of features for each available dataset and each transformed dataset;

applying a plurality of NLP algorithms to each available dataset and each transformed dataset;

monitoring performance metrics when applying the plurality of NLP algorithms to each available dataset and each transformed dataset; and storing the monitored performance metrics.

4. The method of claim 1, wherein generating the set of recommendations comprises:

computing, for a first feature of the plurality of features of the first available dataset and the input dataset, a difference between a first feature value for the first feature of the first available dataset and the input dataset;

determining that the computed difference exceeds a threshold; and generating a first recommendation of the set of recommendations based on the first feature and the computed difference.

5. The method of claim 1, wherein transforming the input dataset comprises:

identifying, in the text of the input dataset, a first element of text that does not comply with a first recommendation of the set of recommendations;

regenerating the first element of text as a first transformed element of text that complies with the first recommendation; and storing the first transformed element of text in a transformed dataset corresponding to the first input dataset.

6. The method of claim 5, wherein transforming the input dataset further comprises:

identifying, based on a second recommendation of the set of recommendations, an additional category of text required for the input dataset;

identifying, from at least one data source, data corresponding to the additional category of text required for the input dataset;

generating, based on the identified data, additional text that satisfies the second recommendation; and storing the additional text in the transformed dataset.

7. The method of claim 1, further comprising:

applying the NLP algorithm to the transformed text of the input dataset.

8. A computer program product, comprising:

a non-transitory computer-readable storage medium having computer readable program code embodied therewith, the computer readable program code executable by a processor to perform an operation comprising:

receiving an input dataset comprising textual data from a plurality of sources;

determining a degree of similarity between a first available dataset, from a plurality of available datasets, and the input dataset; and upon determining that the degree of similarity exceeds a similarity threshold:

generating, based on performance of a natural language processing (NLP) algorithm with respect to the first available data set and based further on a plurality of features of the first available dataset and a plurality of features of the input dataset, a set of recommendations for transforming the input dataset, wherein each recommendation of the set of recommendations, when applied to the input dataset, will increase the degree of similarity between the input dataset and the first available dataset; and transforming the textual data of the input dataset based on the set of recommendations, such that the input dataset becomes more similar to the first available dataset and is optimized for processing by the NLP algorithm.

9. The computer program product of claim 8, wherein the first available dataset is of a plurality of available datasets, wherein identifying the first available dataset comprises:

computing a similarity score reflecting the degree of similarity between the first available dataset and the input dataset; and determining that the similarity score exceeds a similarity threshold.

10. The computer program product of claim 8, the operation further comprising prior to identifying the first available dataset:

receiving a plurality of available datasets including the first available dataset;

transforming each of the plurality of available datasets into a plurality of transformed datasets based on at least one transformation rule;

extracting a plurality of features for each available dataset and each transformed dataset;

applying a plurality of NLP algorithms to each available dataset and each transformed dataset;

monitoring performance metrics when applying the plurality of NLP algorithms to each available dataset and each transformed dataset; and storing the monitored performance metrics.

11. The computer program product of claim 8, wherein generating the set of recommendations comprises:

computing, for a first feature of the plurality of features of the first available dataset and the input dataset, a difference between a first feature value for the first feature of the first available dataset and the input dataset;

determining that the computed difference exceeds a threshold; and generating a first recommendation of the set of recommendations based on the first feature and the computed difference.

12. The computer program product of claim 8, wherein transforming the input dataset comprises:

identifying, in the text of the input dataset, a first element of text that does not comply with a first recommendation of the set of recommendations;

regenerating the first element of text as a first transformed element of text that complies with the first recommendation; and storing the first transformed element of text in a transformed dataset corresponding to the first input dataset.

13. The computer program product of claim 12, wherein transforming the input dataset further comprises:

identifying, based on a second recommendation of the set of recommendations, an additional category of text required for the input dataset;

identifying, from at least one data source, data corresponding to the additional category of text required for the input dataset;

generating, based on the identified data, additional text that satisfies the second recommendation; and storing the additional text in the transformed dataset.

14. The computer program product of claim 8, the operation further comprising:
  applying the NLP algorithm to the transformed text of the input dataset.

15. A system, comprising:
  a processor; and
  a memory storing one or more instructions which, when executed by the processor, performs an operation comprising:
    receiving an input dataset comprising textual data from a plurality of sources;
    determining a degree of similarity between a first available dataset, from a plurality of available datasets, and the input dataset; and
    upon determining that the degree of similarity exceeds a similarity threshold:
      generating, based on performance of a natural language processing (NLP) algorithm with respect to the first available data set and based further on a plurality of features of the first available dataset and a plurality of features of the input dataset, a set of recommendations for transforming the input dataset, wherein each recommendation of the set of recommendations, when applied to the input dataset, will increase the degree of similarity between the input dataset and the first available dataset; and
      transforming the textual data of the input dataset based on the set of recommendations, such that the input dataset becomes more similar to the first available dataset and is optimized for processing by the NLP algorithm.

16. The system of claim 15, wherein the first available dataset is of a plurality of available datasets, wherein identifying the first available dataset comprises:
  computing a similarity score reflecting the degree of similarity between the first available dataset and the input dataset; and
  determining that the similarity score exceeds a similarity threshold.

17. The system of claim 15, the operation further comprising prior to identifying the first available dataset:
  receiving a plurality of available datasets including the first available dataset;
  transforming each of the plurality of available datasets into a plurality of transformed datasets based on at least one transformation rule;
  extracting a plurality of features for each available dataset and each transformed dataset;
  applying a plurality of NLP algorithms to each available dataset and each transformed dataset;
  monitoring performance metrics when applying the plurality of NLP algorithms to each available dataset and each transformed dataset; and
  storing the monitored performance metrics.

18. The system of claim 15, wherein generating the set of recommendations comprises:
  computing, for a first feature of the plurality of features of the first available dataset and the input dataset, a difference between a first feature value for the first feature of the first available dataset and the input dataset;
  determining that the computed difference exceeds a threshold; and
  generating a first recommendation of the set of recommendations based on the first feature and the computed difference.

19. The system of claim 15, wherein transforming the input dataset comprises:
  identifying, in the text of the input dataset, a first element of text that does not comply with a first recommendation of the set of recommendations;
  regenerating the first element of text as a first transformed element of text that complies with the first recommendation; and
  storing the first transformed element of text in a transformed dataset corresponding to the first input dataset.

20. The system of claim 19, wherein transforming the input dataset further comprises:
  identifying, based on a second recommendation of the set of recommendations, an additional category of text required for the input dataset;
  identifying, from at least one data source, data corresponding to the additional category of text required for the input dataset;
  generating, based on the identified data, additional text that satisfies the second recommendation; and
  storing the additional text in the transformed dataset.

* * * * *